(12) United States Patent
Bouquerel et al.

(10) Patent No.: US 9,200,124 B2
(45) Date of Patent: Dec. 1, 2015

(54) COMPOSITE MATERIALS COMPRISING A REINFORCING MATERIAL AND A THERMOPLASTIC MATRIX, PRECURSOR COMPOUND ARTICLE OF SAID MATERIALS AND PRODUCTS OBTAINED USING SAME

(75) Inventors: Franck Bouquerel, Lyons (FR); Frederic Philippon, Ecully (FR)

(73) Assignee: RHODIA OPERATIONS, Paris (FR)

( * ) Notice: Subject to any disclaimer, the term of this patent is extended or adjusted under 35 U.S.C. 154(b) by 800 days.

(21) Appl. No.: 10/583,168

(22) PCT Filed: Dec. 20, 2004

(86) PCT No.: PCT/FR2004/003310
§ 371 (c)(1),
(2), (4) Date: May 14, 2007

(87) PCT Pub. No.: WO2005/061209
PCT Pub. Date: Jul. 7, 2005

(65) Prior Publication Data
US 2008/0020219 A1  Jan. 24, 2008

(30) Foreign Application Priority Data
Dec. 19, 2003 (FR) ...................... 03 14994

(51) Int. Cl.
*B32B 27/04* (2006.01)
*C08J 5/04* (2006.01)
*C08K 5/20* (2006.01)
*C08G 69/36* (2006.01)
*C08L 77/02* (2006.01)
*B29C 70/46* (2006.01)
*B29K 77/00* (2006.01)

(52) U.S. Cl.
CPC ............... *C08J 5/04* (2013.01); *B29C 70/465* (2013.01); *C08G 69/36* (2013.01); *C08K 5/20* (2013.01); *C08L 77/02* (2013.01); *B29K 2077/00* (2013.01); *Y10T 428/31504* (2015.04); *Y10T 428/31725* (2015.04); *Y10T 428/31736* (2015.04)

(58) Field of Classification Search
CPC ........... C08L 77/02; C08G 69/36; C08K 5/20
USPC ............................. 428/296.4, 297.4; 528/310
See application file for complete search history.

(56) References Cited

U.S. PATENT DOCUMENTS

| 3,549,601 A | | 12/1970 | Fowell | |
| 3,893,981 A | * | 7/1975 | Thoma et al. | 528/324 |
| 3,920,879 A | | 11/1975 | Segal et al. | |
| 4,927,583 A | | 5/1990 | Lottian et al. | |
| 4,962,162 A | * | 10/1990 | Kosuda et al. | 525/422 |
| 5,047,263 A | * | 9/1991 | Glemet | 427/203 |
| 5,597,888 A | * | 1/1997 | Nielinger et al. | 528/335 |
| 6,160,080 A | * | 12/2000 | Cucinella et al. | 528/170 |
| 7,323,241 B2 | * | 1/2008 | Myard et al. | 428/296.4 |
| 2003/0018135 A1 | * | 1/2003 | Pagilagan et al. | 525/178 |
| 2004/0177911 A1 | | 9/2004 | Dittmar | |
| 2006/0234025 A1 | | 10/2006 | Myard et al. | |

FOREIGN PATENT DOCUMENTS

| EP | 0 216 109 A2 | 4/1987 |
| EP | 0 743 165 A2 | 11/1996 |
| FR | 2 158 422 A1 | 6/1973 |
| FR | 2 603 891 A1 | 3/1988 |
| GB | 749479 | 5/1956 |
| WO | WO 93/25736 A1 | 12/1993 |
| WO | WO 02/062563 A1 | 8/2002 |
| WO | WO 03/029350 A1 | 4/2003 |

OTHER PUBLICATIONS

International Search Report PCT/FR2004/003310 dated Jun. 6, 2005.
Hegde et al., "Nylon Fibers", Apr. 2004 http://www.engr.utk.edu/mse/Textiles/Nylon%20fibers.htm.

* cited by examiner

Primary Examiner — Gregory Listvoyb

(57) ABSTRACT

The invention relates to a precursor article of a composite material comprising a polymer matrix and at least one reinforcing wire and/or fibers, said article comprising at least one reinforcing wire and/or fibers and at least one polymer matrix wire and/or fibers. The invention also relates to composite materials comprising a reinforcing material and a thermoplastic matrix and to the articles obtained using said materials.

28 Claims, No Drawings

COMPOSITE MATERIALS COMPRISING A REINFORCING MATERIAL AND A THERMOPLASTIC MATRIX, PRECURSOR COMPOUND ARTICLE OF SAID MATERIALS AND PRODUCTS OBTAINED USING SAME

This application is an application under 35 U.S.C. Section 371 of International Application Number PCT/FR2004/003310 filed on Dec. 20, 2004.

The field of the invention is that of composite materials and their manufacturing processes.

More precisely, the invention relates to the use of certain polycondensates for impregnating reinforcing materials, especially in the form of yarns and/or fibers, which are intended to act as thermoplastic matrix in composite materials.

The term "yarn" is understood to mean a monofilament, a continuous multifilament yarn or a staple fiber yarn, obtained from a single type of fiber or from several types of fiber as an intimate blend. The continuous yarn may also be obtained by assembling several multifilament yarns.

The term "fiber" is understood to mean a filament or combination of filaments that are chopped, cracked or converted.

In the field of high-performance materials, composites have taken pride of place owing to their performance characteristics and the weight savings that they allow. The most common high-performance composites known to date are obtained from thermosetting resins, the use of which is limited to low-volume applications, mainly in the aeronautical industry, motor sports and, in the best cases, applications having manufacturing times of around 15 minutes, such as for example for the manufacture of skis. The cost of these materials and/or the manufacturing times make them incompatible with high-volume usage.

One solution, with regard to the manufacturing time, is provided by composites having a thermoplastic matrix. Thermoplastic resins are in general known for their high viscosity, which impedes their use for impregnating reinforcing materials generally composed of very dense bundles of filaments. The use of commercially available thermoplastic, especially polyamide, matrices results in impregnation difficulties requiring either prolonged impregnation times or high processing pressures. In most cases, the composite materials obtained from these matrices may have microvoids and unimpregnated regions. These microvoids cause the mechanical properties to drop, premature aging of the material and, when it is laminated, delamination problems.

To improve the impregnation of reinforcing yarns with the matrix and the adhesion between the reinforcing yarns and the matrix, several approaches have been explored.

The first of these approaches has consisted in using linear polyamides of lower molecular weight as matrix.

Thus, document FR-2 158 422 describes a composite sheet consisting of a polyamide matrix and reinforcing fibers of the glass fiber type. The polyamide is obtained by the polycondensation of ε-caprolactam, the molecular weight of which is between 3000 and 25 000 g/mol, having the capability, thanks to its low viscosity, of suitably impregnating the reinforcing fibers and thus of limiting the appearance of microvoids in the finished product. That document also describes a process for forming this composite sheet.

In general, the use of low-molecular-weight polyamides in the matrix has the major drawback of impairing the mechanical properties of the composite, especially as regards tensile strength, resistance to elongation and fatigue behavior, since, when high-performance composites reinforced by long fibers are employed, the mechanical properties of these composites are dependent on the plasticity of the matrix, which transmits the stresses to the reinforcement, and on the mechanical properties of said matrix.

Another approach for improving the impregnation of reinforcing fibers with the matrix consists in employing a matrix in the form of an oligomer or a prepolymer of low molecular weight which can be polymerized in situ by polycondensation.

Thus, document FR-A-2 603 891 relates to a process for manufacturing a composite material consisting of a polyamide matrix reinforced by long reinforcing fibers. These fibers are impregnated with a polyamide prepolymer or oligomer which has, at each end of the molecular chain, a reactive functional group capable of reacting with another oligomer or prepolymer molecule under the effect of heating, which results in the extension of the polymer chain in order to obtain a polyamide of high molecular weight. The oligomer or prepolymer of low molecular weight has the characteristic of being fluid in the molten state. The polyamides used are preferably polyamides nylon-6, nylon-6,6, nylon-6,10, nylon-6,12, nylon-11 and nylon-12. The impregnated fibers are then pultruded through a shaping die, at high temperature, so as to form profiles.

This process remains close to conventional polymerization processes and therefore has cycle times incompatible with a high production rate. If the cycle times are adapted so as to make them compatible with mass production, the molecular weight of the polyamide obtained, which constitutes the matrix, is too low to provide the latter with a good level of mechanical properties.

Document EP-B-0 133 825 describes a flexible composite material mainly consisting of a reinforcing material in the form of a roving of parallel continuous fibers impregnated with a thermoplastic powder, preferably a polyamide powder, and of a thermoplastic matrix in the form of a sheath around the roving of continuous fibers, it being possible for this sheath to also be made of a polyamide. This material is characterized in that the constituent polymer of the thermoplastic matrix possesses a melting point not exceeding that of the constituent polymer of the thermoplastic powder, so that the sheathing of the powder-coated fibers is carried out by melting the thermoplastic matrix without melting the powder, in such a way that the latter isolates the fibers from the sheath.

One drawback of using a thermoplastic polymer in powder form is the need to use complex equipment, which limits the quantity of composite obtained. It is therefore clearly apparent that this process is not very compatible with mass production.

Document US-B-5 464 684 describes a hybrid yarn comprising a core of intimately mingled reinforcing filaments and low-viscosity polyamide filaments, which form the matrix. This core is covered with a continuous polyamide yarn, preferably of the same type as that used for the core. The polyamide used is of the nylon-6 or nylon-6,6 type, but may also consist of nylon-6,6 T, nylon-6,10, nylon-10 or a polyamide obtained from adipic acid and 1,3-xylylenediamine. The reinforcing fibers are carbon fibers or glass fibers.

The technique used to manufacture such a hybrid yarn is admittedly suitable for low-volume applications, such as the manufacture of tennis rackets. However, it is difficult to envisage the use of such a method for production on a larger scale.

Document WO 03/029350 describes the use of a star polyamide as matrix, such a polyamide having a good melt flow index, allowing the reinforcing materials to be properly impregnated.

One object of the present invention is therefore to remedy the drawbacks described above by proposing a precursor article of a composite material, comprising various types of yarns and/or fibers, and especially at least one reinforcing yarn and/or fibers and at least one yarn and/or fibers generating a thermoplastic matrix having a high melt flow index, allowing very good impregnation of the reinforcing yarns and/or fibers during formation of the composite material. Such an article makes it possible to obtain a composite material using a simple rapid compression molding technique.

Another object of the invention is to propose a composite material obtained from this article and exhibiting good mechanical properties.

Lastly, a final object of the invention is to provide a composite material having the advantage of manufacturing cost reduction by the use of tooling operating at low pressures and with shorter cycle times.

For this purpose, the invention relates to a precursor article of a composite material comprising a polymeric matrix and at least one reinforcing yarn and/or fibers, said article comprising at least one reinforcing yarn and/or fibers and at least one polymeric-matrix yarn and/or fibers, characterized in that:
  said reinforcing yarn and/or fibers are made of reinforcing material and optionally include a part made of a thermoplastic polymer;
  said polymeric-matrix yarn and/or fibers are made of a thermoplastic polymer, and in that:
  said thermoplastic polymer of said reinforcing yarn and/or fibers and/or of said polymeric-matrix yarn and/or fibers comprises at least one polycondensate consisting of:
    30 to 100 mol % (limits inclusive) of macromolecular chains satisfying the following formula (I):

$R_3—(X—R_2—Y)_n—X-A-R_1-A-X—(Y—R_2—X)_m—R_3$ (I)

0 to 70 mol % (limits inclusive) of macromolecular chains satisfying the following formula (II):

$R_4—[Y—R_2—X]_p—R_3$ (II)

in which chains:
    —X—, —Y— is a radical obtained from the condensation of two reactive functional groups $F_1$ and $F_2$ such that:
    $F_1$ is the precursor of the —X— radical and $F_2$ is the precursor of the —Y— radical, or vice versa,
    the functional groups $F_1$ cannot react together by condensation and
    the functional groups $F_2$ cannot react together by condensation;
    A is a covalent bond or an aliphatic hydrocarbon radical that may comprise heteroatoms and contains 1 to 20 carbon atoms;
    $R_2$ is a branched or unbranched, aliphatic or aromatic hydrocarbon radical containing 2 to 20 carbon atoms;
    $R_3$, $R_4$ represents hydrogen, a hydroxyl radical or a hydrocarbon radical;
    $R_1$ is a linear or cyclic, aromatic or aliphatic, hydrocarbon radical containing at least 2 carbon atoms and possibly including heteroatoms; and
    n, m and p each represent a number between 30 and 200.

All the known polycondensation functional groups may be used within the context of the invention for $F_1$ and $F_2$.

In the polycondensate, the radicals $R_2$ may be of the same type or may differ from one another.

According to one particular embodiment of the invention, the polymeric matrix is a polyamide A1 consisting of:
  30 to 100 mol % (limits inclusive) of macromolecular chains satisfying the following formula (I):

$R_3—(X—R_2—Y)_n—X-A-R_1-A-X—(Y—R_2—X)_m—R_3$ (I)

0 to 70 mol % (limits inclusive) of macromolecular chains satisfying the following formula (II):

$R_4—[Y—R_2—X]_p—R_3$ (II)

in which:
  —Y is the

radical when X represents the

radical;
  —Y is the

radical when X represents the

radical;
  A is a covalent bond or an aliphatic hydrocarbon radical possibly including heteroatoms and containing 1 to 20 carbon atoms;
  $R_2$ is a branched or unbranched, aliphatic or aromatic, hydrocarbon radical containing 2 to 20 carbon atoms;
  $R_3$, $R_4$ represents hydrogen, a hydroxyl radical or a hydrocarbon radical comprising a

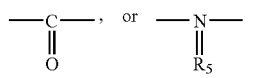

group;
  $R_5$ represents hydrogen or a hydrocarbon radical containing 1 to 6 carbon atoms;
  $R_1$ is a linear or cyclic, aromatic or aliphatic, hydrocarbon radical containing at least 2 carbon atoms and possibly including heteroatoms; and
  n, m and p each represent a number between 30 and 200.

According to another particular embodiment of the invention, the polymeric matrix of the invention consists of a polyester A2 consisting of:
  30 to 100 mol % (limits inclusive) of macromolecular chains satisfying the following formula (I):

$R_3—(X—R_2—Y)_n—X-A-R_1-A-X—(Y—R_2—X)_m—R_3$ (I)

0 to 70 mol % (limits inclusive) of macromolecular chains satisfying the following formula (II):

$R_4—[Y—R_2—X]_p—R_3$ (II)

in which chains:
—Y is the —O— radical when X represents the

radical;
—Y is the

radical when X represents the —O— radical;

A is a covalent bond or an aliphatic hydrocarbon radical possibly including heteroatoms and containing 1 to 20 carbon atoms;

$R_2$ is a branched or unbranched, aliphatic or aromatic, hydrocarbon radical containing 2 to 20 carbon atoms;

$R_3$, $R_4$ represents hydrogen, a hydroxyl radical or a hydrocarbon radical comprising a

or —O— group;

$R_1$ is a linear or cyclic, aromatic or aliphatic, hydrocarbon radical containing at least 2 carbon atoms and possibly including heteroatoms; and n, m and p each represent a number between 30 and 200.

The polymeric matrix of the invention may also be a copolyesteramide.

Advantageously, m, n and p are between 30 and 250.

Advantageously, $R_2$ is a pentamethylene radical.

The polyamide A1 or the polyester A2 of the invention advantageously comprises at least 45 mol %, preferably at least 60 mol % and even more preferably at least 80 mol % of macromolecular chains satisfying formula (I).

The polyamide A1 or the polyester A2 of the invention advantageously has a number-average molecular weight of not less than 5000 g/mol but not exceeding 25 000 g/mol.

The thermoplastic polymer yarns and/or fibers intended to act as matrix will be called hereafter "matrix yarns and/or fibers".

The term "number-average molecular weight" of the polyamide A1 or of the polyester A2 is understood to mean the number-average molecular weight weighted by the molar fractions of the two types of macromolecular chain of formulae (I) and (II).

According to one particular embodiment of the invention, the polyamide A1 or the polyester A2 is obtained by copolymerization from a monomer mixture comprising:

a) a difunctional compound, the reactive functional groups of which are chosen from amines, carboxylic acids, alcohols and derivatives thereof, the reactive functional groups being identical;

b) monomers of the following general formulae ($III_a$) and ($III_b$) in the case of the polyamide A1:

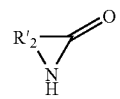

b') monomers of the following general formulae ($III_a'$) and ($III_b'$) in the case of the polyester A2:

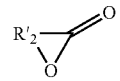

in which formulae:

$R'_2$ represents a substituted or unsubstituted, aliphatic, cycloaliphatic or aromatic hydrocarbon radical containing 2 to 20 carbon atoms and possibly including heteroatoms;

Y' is an amine radical when X' represents a carboxylic radical, or Y' is a carboxylic radical when X' represents an amine radical, in the case of the polyamide A1; and Y' is a hydroxyl radical when X' represents a carboxylic radical, or Y' is a carboxylic radical when X' represents a hydroxyl radical, in the case of the polyester A2.

The terms "carboxylic acid" and "carboxylic radical" are understood to mean in the present invention carboxylic acids and their derivatives, such as acid anhydrides, acid chlorides, esters, nitriles, etc. The term "amine" is understood to mean amines and their derivatives.

The monomers of formula ($III_a$) or ($III_b$) are preferably the monomers for polyamides of the type comprising nylon-6, nylon-11, nylon-12, etc. Examples of monomers of formula ($III_a$) or ($III_b$) that may be suitable in the context of the invention include caprolactam, 6-amino-caproic acid, lauryllactam, etc. A mixture of different monomers may also be used.

As examples of monomers of formula ($III_a'$) or ($III_b'$) that may be suitable within the context of the invention, mention may be made of caprolactone, δ-valerolactone, 4-hydroxybenzoic acid, etc.

The monomer mixture may also include a monofunctional monomer conventionally used in the production of polymers as a chain stopper.

The monomer mixture may also include catalysts.

Advantageously, compound a) represents between 0.1 and 2 mol % relative to the number of moles of monomers of type b) or b').

In the case of the polyamide A1, the copolymerization of the monomers is carried out under conventional conditions for polymerizing polyamides obtained from lactams or amino acids.

In the case of the polyester A2, the copolymerization of the monomers is carried out under conventional conditions for polymerizing polyesters obtained from lactones or hydroxyacids.

The polymerization may include a finishing step so as to obtain the desired degree of polymerization.

According to another particular embodiment of the invention, the polyamide A1 or the polyester A2 is obtained by melt blending, for example using an extruder, a polyamide of the type of those obtained by polymerization of lactams and/or amino acids or a polyester of the type of those obtained by polymerization of lactones and/or hydroxyacids and a difunctional compound, the reactive functional groups of which are chosen from amines, alcohols, carboxylic acids and derivatives thereof, the reactive functional groups being identical. The polyamide is for example nylon-6, nylon-11, nylon-12, etc. The polyester is for example polycaprolactone, polypivalolactone, etc.

The difunctional compound is added directly into the polyamide or the polyester in the melt state.

Advantageously, the difunctional compound represents between 0.05 and 2% by weight relative to the weight of polyamide or polyester.

The difunctional compound of the invention is preferably represented by formula (IV):

$$X''\text{-}A\text{-}R_1\text{-}A\text{-}X'' \quad (IV)$$

in which X" represents an amine radical, a hydroxyl radical, a carboxylic group or derivatives thereof, $R_1$ and A being as described above.

Examples of the radical X" that may be mentioned include a primary amine radical, a secondary amine radical, etc.

The difunctional compound may be a dicarboxylic acid. Examples of diacids that may be mentioned include adipic acid, which is the preferred acid, decanoic or sebacic acid, dodecanoic acid and phthalic acids, such as terephthalic acid and isophthalic acid. It may be a mixture comprising by-products resulting from the manufacture of adipic acid, for example a mixture of adipic acid, glutaric acid and succinic acid.

The difunctional compound may be a diamine. Examples of diamines that may be mentioned include hexamethylenediamine, methylpentamethylenediamine, 4,4'-diaminodicyclohexylmethane, butanediamine and metaxylylenediamine.

The functional compound may be a dialcohol. Examples of dialcohols that may be mentioned include 1,3-propanediol, 1,2-ethanediol, 1,4-butanediol, 1,5-pentanediol, 1,6-hexanediol and polytetrahydrofuran.

The functional compound may be a mixture of a diamine and a dialcohol.

In the case of the polyamide A1, the reactive functional groups of the difunctional compound are generally amines or carboxylic acids or derivatives thereof.

In the case of the polyester A2, the reactive functional groups of the difunctional compound are generally alcohols or carboxylic acids or derivatives thereof.

Preferably, the difunctional compound is chosen from adipic acid, decanoic or sebacic acid, dodecanoic acid, terephthalic acid, isophthalic acid, hexamethylenediamine, methylpentamethylenediamine, 4,4'-diaminodicyclohexylmethane, butanediamine, metaxylylenediamine, 1,3-propanediol, 1,2-ethanediol, 1,4-butanediol, 1,5-pentanediol, 1,6-hexanediol and polytetrahydrofuran.

According to another particular embodiment of the invention, the polyamide A1 or the polyester A2 is obtained by melt blending, for example using an extruder, a polyamide of the type of those obtained by polymerization of lactams and/or amino acids or a polyester of the type of those obtained by polymerization of lactones and/or hydroxyacids, with a compound of formula (V):

$$G\text{-}R\text{-}G \quad (V)$$

in which:
R is a substituted or unsubstituted, linear or cyclic, aromatic or aliphatic hydrocarbon radical possibly including heteroatoms; and G is a functional group or a radical that may react selectively either with the amine reactive functional groups, or with the alcohol reactive functional groups, or with the carboxylic acid reactive functional groups of the polyamide or of the polyester, in order to form covalent bonds. The polyamide is for example nylon-6, nylon-11 or nylon-12. The polyester is for example polycaprolactone or polypivalolactone.

The compound of formula (V) is added directly to the polyamide or to the polyester in the melt state.

Advantageously, the compound of formula (V) represents between 0.05 and 2% by weight relative to the weight of polyamide or polyester.

All polymer chain couplers or polymer chain extenders known to those skilled in the art, generally comprising two identical functional groups or two identical radicals, and selectively reacting either with the amine reactive functional groups or with the alcohol reactive functional groups, or with the carboxylic acid reactive functional groups of the polyamide or of the polyester, in order to form covalent bonds, may be used as compound of formula (V).

In the case of obtaining polyamide A1, compound (V) may for example react selectively with the amine functional groups of the polyamide into which it is introduced. This compound will not react with the acid functional groups of the polyamide in this case.

Advantageously, when the reinforcing yarns and/or fibers comprise a thermoplastic polymer, this is preferably in the form of a sheath of polymer that covers the reinforcing yarns and/or fibers.

According to a variant of the invention, the precursor article of the composite also includes at least one matrix yarn and/or fibers made of a linear thermoplastic polymer.

According to a preferred feature, this linear polymer is an aliphatic and/or semicrystalline polyamide or copolyamide chosen from the groups comprising nylon-4,6, nylon-6, nylon-6,6, nylon-6,9, nylon-6,10, nylon-6,12, nylon-6,36, nylon-11, nylon-12 or a semicrystalline semiaromatic polyamide or copolyamide chosen from the group comprising polyphthalamides, and blends of these polymers and of their copolymers.

The matrix yarns and/or fibers may also include all the useful additives such as flame retardants, plasticizers, heat and light stabilizers, waxes, pigments, nucleating agents, antioxidants, impact modifiers or the like known to those skilled in the art.

Advantageously, the reinforcing yarns and/or fibers are chosen from carbon, glass, aramid and polyimide yarns and/or fibers.

According to a variant of this feature, the reinforcing yarns and/or fibers are natural yarns and/or fibers chosen from sisal, hemp and flax yarns and/or fibers.

Advantageously, the article according to the invention also includes a matrix precursor powder material, which may for example be a polyamide.

Preferably, a powder having a particle size of between 1 and 100 microns will be used.

Preferably, the article according to the invention is formed from continuous or chopped yarns, tapes, mats, braids, wovens, knits, webs, multiaxial fabrics, nonwovens and/or complex forms comprising several of the aforementioned forms. As examples, a complex form may be a web combined with a nonwoven or with continuous yarns.

Another subject of the invention is a composite obtained from an article as defined above by at least partial melting of the matrix yarns and/or fibers. This composite comprises a polymeric matrix and reinforcing yarns and/or fibers.

The term "partial melting" is understood to mean the melting of at least part of at least one matrix yarn and/or fiber.

This melting may be carried out by compression molding by applying pressure at a temperature above the melting point of the polymeric matrix. This melting allows the reinforcing yarns and/or fibers to be uniformly impregnated with the matrix.

According to a preferred feature, the composite thus obtained has a reinforcement content of between 25 and 80% by weight.

Yet another subject of the invention is a semifinished product obtained by a process of compression molding or calendering the aforementioned article, during which the matrix yarns and/or fibers are at least partially melted so as to impregnate the reinforcing yarns and/or fibers.

Also advantageously, this semifinished product is in sheet or tape form.

The semifinished product consists of an intermediate product in which the reinforcing yarns and/or fibers have been impregnated with the polymeric matrix, which is in the form of a continuous phase. This product is not yet in its final form.

The semifinished product must undergo a subsequent forming step, by a forming or compression molding process known to those skilled in the art, at temperatures above their glass transition temperature but below its melting point, allowing a finished product to be obtained.

Yet another subject of the invention is a finished product obtained by a process of compression molding the aforementioned article to the final shape, during which the matrix yarns and/or fibers are at least partially melted so as to impregnate the reinforcing yarns and/or fibers.

In general, the compression molding processes used involve low pressures (below 20 bar), temperatures below 290° C. and short times (less than 5 minutes).

Other details and advantages of the invention will become more clearly apparent in the light of the examples given below, solely by way of indication and for the purpose of illustration.

Matrix used: polyamide A1 according to the invention, obtained by the polycondensation of caprolactam in the presence of 0.6 mol % adipic acid under conventional polyamide polymerization conditions using caprolactam.

EXAMPLE 1

Semifinished Slab Produced from Polyamide According to the Invention and Reinforcing Yarns A series of trials was performed using a polyamide A1 multifilament yarn described above, having a strand linear density of between 21 and 22 dtex and a tenacity of about 23 cN/tex. Such a multifilament was assembled, in a multiaxial weaving operation, with a continuous glass reinforcing yarn having a linear density of 600 tex. To validate the high melt flow of the matrix, multiaxial woven fabrics were produced from elementary layers, each being defined as below:
Elementary Layer
  ply 1: reinforcing yarn, −45° orientation
  ply 2: reinforcing yarn, +45° orientation
  ply 3: polyamide A1 (matrix) yarn, 90° orientation.

A laminated composite was then produced by placing several (between 2 and 10) elementary layers of the fabric obtained in a slab-shaped mold between the heated plates of a press, for a time of 1 to 3 minutes, under a pressure of between 1 and 20 bar and a temperature between 250 and 260° C. (above the melting point of the polyamide A1). After cooling down to a temperature of 50-60° C., the composite was demolded. The reinforcement content was then between 60 and 70% by weight.

The high melt flow of the polyamide A1 made it possible to achieve good impregnation of the reinforcement with the matrix without causing the reductions in mechanical properties or the fatigue strength problems observed with low-molecular-weight polymers. The mechanical properties in bending are compared with those of a thermoset-based composite obtained from the same reinforcing material and an epoxy resin in Table 1.

TABLE 1

| Polyamide/glass fiber composite slab | | | |
|---|---|---|---|
|  | Tensile strength (MPa) | Flexural modulus (MPa) | Elongation at break (%) |
| Epoxy matrix/glass fibers | 630.0 | 21 000 | 3.53 |
| PA1 matrix/glass fibers | 517 | 21 000 | 3.26 |

The use of a reinforcement in continuous yarn form makes it possible to maintain high mechanical properties in preferred directions. The fact of using the matrix in the form of a yarn provides, in addition to an economic advantage compared with the conventional solutions of powder coating or preimpregnation, easy handling and good control of the reinforcement content of the final composite.

Table 2 summarizes the mechanical properties obtained.

TABLE 2

| Summary of the mechanical properties obtained | | | |
|---|---|---|---|
|  | Units | Standard | PA A1/glass multiaxial fabric |
| Degree of impregnation (p/p) | % |  | 65 |
| Density |  |  | 1.8 |
| Simple tension |  |  |  |
| Stress at break | MPa | ISO 527 | 545 |
| Young's modulus | GPa | ISO 527 | 21.3 |
| Elongation | % | ISO 527 | 2.76 |
| 3-point bending |  |  |  |
| Stress at break | MPa | ISO 14125 | 517 |
| Flexural modulus | GPa | ISO 14125 | 21 |
| Multiaxial shock |  |  |  |
| Maximum force | DaN | ISO 6603-2 | 650 |

The invention claimed is:
1. A precursor article of a composite material comprising a multiaxial woven fabric, the fabric including at least a reinforcing layer and a polymeric layer, wherein:
  said reinforcing layer comprises at least one reinforcing yarn and/or fibers;
  said polymer layer comprising a polymeric matrix yarn and/or fibers, distinct from the reinforcing yarn and/or fibers;
  said reinforcing yarn and/or fibers are made of reinforcing material and optionally include a part made of thermoplastic polymer;
  said polymeric-matrix yarn and/or fibers are made of a thermoplastic polymer, said thermoplastic polymer of said reinforcing yarn and/or fibers and of said polymeric-matrix yarn and/or fibers comprises at least one polycondensate consisting of:

30 to 100 mol %, limits inclusive, of macromolecular chains satisfying the following formula (I):

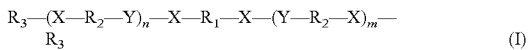  (I)

0 to 70 mol %, limits inclusive, of macromolecular chains satisfying the following formula (II):

  (II)

in which chains:

—X—, —Y— is a radical obtained from the condensation of two reactive functional groups $F_1$ and $F_2$ such that:
$F_1$ is the precursor of the —X— radical and $F_2$ is the precursor of the —Y— radical, or vice versa,
the functional groups $F_1$ cannot react together by condensation and
the functional groups $F_2$ cannot react together by condensation;

$R_2$ is a branched or unbranched, aliphatic or aromatic hydrocarbon radical containing 2 to 20 carbon atoms;

$R_3$, $R_4$ represents hydrogen, a hydroxyl radical or a hydrocarbon radical;

$R_1$ is a linear or cyclic, aromatic or aliphatic, hydrocarbon radical containing at least 2 carbon atoms and optionally including heteroatoms; and n, m and p each represent a number between 30 and 200, wherein the polycondensate is obtained by melt blending a polyamide obtained by polymerization of lactams and/or amino acids or a polyester obtained by polymerization of lactones and/or hydroxyacids, with a difunctional compound, wherein the difunctional compound comprises at least one of adipic acid, decanoic or sebacic acid, dodecanoic acid, terephthalic acid, isophthalic acid, hexamethylenediamine, methylpentamethylenediamine, 4,4'-diaminodicyclohexylmethane, butanediamine, metaxylylenediamine, 1,3-propanediol, 1,2-ethanediol, 1,4-butanediol, 1,5-pentanediol, 1,6-hexanediol or polytetrahydrofuran, wherein, when a polyamide is present in the thermoplastic polymer, said polyamide consists of at least one polyamide of formula A1 having:

30 to 100 mol %, limits inclusive, of macromolecular chains satisfying the following formula (I):

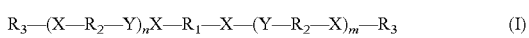  (I)

0 to 70 mol %, limits inclusive, of macromolecular chains satisfying the following formula (II):

  (II)

in which:
Y is the

radical when X represents the

radical;

Y is the

radical when X represents the

radical;

$R_2$ is a branched or unbranched, aliphatic or aromatic, hydrocarbon radical containing 2 to 20 carbon atoms;

$R_3$, $R_4$ represents hydrogen, a hydroxyl radical or a hydrocarbon radical comprising a

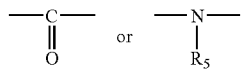

group;

$R_5$ represents hydrogen or a hydrocarbon radical containing 1 to 6 carbon atoms;

$R_1$ is a linear or cyclic, aromatic or aliphatic, hydrocarbon radical containing at least 2 carbon atoms and optionally including heteroatoms; and n, m and p each represent a number between 30 and 200.

2. The article as claimed in claim 1, wherein the thermoplastic polymer comprises at least one polyamide A1.

3. The article as claimed in claim 1, wherein the thermoplastic polymer comprises at least one polyester A2 consisting of:

30 to 100 mol %, limits inclusive, of macromolecular chains satisfying the following formula (I):

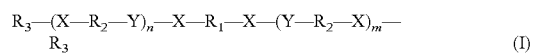  (I)

0 to 70 mol %, limits inclusive, of macromolecular chains satisfying the following formula (II):

  (II)

in which chains:
Y is the —O— radical when X represents the

radical;
Y is the

radical when X represents the —O— radical;

$R_2$ is a branched or unbranched, aliphatic or aromatic, hydrocarbon radical containing 2 to 20 carbon atoms;

$R_3$, $R_4$ represents hydrogen, a hydroxyl radical or a hydrocarbon radical; comprising a

or —O— group;

R$_1$ is a linear or cyclic, aromatic or aliphatic, hydrocarbon radical containing at least 2 carbon atoms and optionally including heteroatoms; and n, m and p each represent a number between 30 and 200.

4. The article as claimed in claim 1, wherein n, m and p are 30 to 150.

5. The article as claimed in claim 1, wherein the thermoplastic polymer comprises at least one polyamide A1 or at least one polyester A2, wherein the at least one polyamide A1 consists of:

30 to 100 mol %, limits inclusive, of macromolecular chains satisfying the following formula (I):

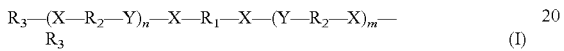  (I)

0 to 70 mol %, limits inclusive, of macromolecular chains satisfying the following formula (II):

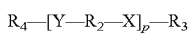  (II)

in which:
Y is the

radical when X represents the

radical;
Y is the

radical when X represents the

radical;

R$_2$ is a branched or unbranched, aliphatic or aromatic, hydrocarbon radical containing 2 to 20 carbon atoms;

R$_3$, R$_4$ represents hydrogen, a hydroxyl radical or a hydrocarbon radical comprising a

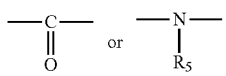

group;

R$_5$ represents hydrogen or a hydrocarbon radical containing 1 to 6 carbon atoms;

R$_1$ is a linear or cyclic, aromatic or aliphatic, hydrocarbon radical containing at least 2 carbon atoms and optionally including heteroatoms; and n, m and p each represent a number between 30 and 200;

wherein the at least one polyester A2 consists of:

30 to 100 mol %, limits inclusive, of macromolecular chains satisfying the following formula (I):

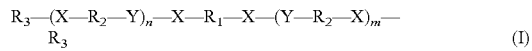  (I)

0 to 70 mol %, limits inclusive, of macromolecular chains satisfying the following formula (II):

  (II)

in which chains:
Y is the —O— radical when X represents the

radical;
Y is the

radical when X represents the —O— radical;

R$_2$ is a branched or unbranched, aliphatic or aromatic, hydrocarbon radical containing 2 to 20 carbon atoms;

R$_3$, R$_4$ represents hydrogen, a hydroxyl radical or a hydrocarbon radical comprising a

or —O— group;

R$_1$ is a linear or cyclic, aromatic or aliphatic, hydrocarbon radical containing at least 2 carbon atoms and optionally including heteroatoms; and n, m and p each represent a number between 30 and 200.

6. The article as claimed in claim 5, wherein the polyamide A1 or the polyester A2 comprises at least 45 mol %, of macromolecular chains satisfying formula (I).

7. The article as claimed in claim 1, wherein R$_2$ is a pentamethylene radical.

8. The article as claimed in claim 5, wherein the polyamide A1 or the polyester A2 is obtained by copolymerization from a monomer mixture comprising:

a) a difunctional compound, the reactive functional groups of which are selected from the group consisting of amines, carboxylic acids, alcohols and derivatives thereof, the reactive functional groups being identical;

b) monomers of the following general formulae (III$_a$) and (III$_b$) in the case of the polyamide A1:

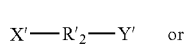 or  (III$_a$)

-continued $$R'_2 \underset{H}{\overset{}{\diagdown\!\!\!\!\diagup}} \!\!\!\!\! \overset{O}{\diagup} \qquad\qquad (III_b)$$

b') monomers of the following general formulae (III$_a$') and (III$_b$') in the case of the polyester A2:

$$X'\text{---}R'_2\text{---}Y' \quad \text{or} \qquad\qquad (III_a')$$

$$R'_2 \underset{O}{\overset{}{\diagdown\!\!\!\!\diagup}} \!\!\!\!\! \overset{O}{\diagup} \qquad\qquad (III_b')$$

in which formulae:

R'$_2$ represents a substituted or unsubstituted, aliphatic, cycloaliphatic or aromatic hydrocarbon radical containing 2 to 20 carbon atoms and optionally including heteroatoms;

Y' is an amine radical when X' represents a carboxylic radical, or Y' is a carboxylic radical when X' represents an amine radical, in the case of the polyamide A1; and Y' is a hydroxyl radical when X' represents a carboxylic radical, or Y' is a carboxylic radical when X' represents a hydroxyl radical, in the case of the polyester A2.

9. The article as claimed in claim 8, wherein compound a) represents 0.1 to 2 mol % relative to the number of moles of monomers of type b) or b').

10. The article as claimed in claim 8, wherein the difunctional compound represents 0.05 to 2% by weight relative to the weight of polyamide or polyester.

11. The article as claimed in claim 5, wherein the polyamide A1 or the polyester A2 is obtained by melt blending a polyamide obtained by polymerization of lactams and/or amino acids or a polyester obtained by polymerization of lactones and/or hydroxyacids, with a compound of formula (V):

$$\text{G-R-G} \qquad\qquad (V)$$

in which:

R is a substituted or unsubstituted, linear or cyclic, aromatic or aliphatic hydrocarbon radical optionally including heteroatoms; and G is a functional group or a radical that may react selectively either with the amine reactive functional groups, or with the alcohol reactive functional groups, or with the carboxylic acid reactive functional groups of the polyamide or of the polyester, in order to form covalent bonds.

12. The article as claimed in claim 11, wherein the compound of formula (V) represents 0.05 to 2% by weight relative to the weight of polyamide or polyester.

13. The article as claimed in claim 1, further comprising at least one matrix yarn and/or fibers made of a linear thermoplastic polymer.

14. The article as claimed in claim 13, wherein the linear polymer is an aliphatic and/or semicrystalline polyamide or copolyamide which is nylon-4,6, nylon-6, nylon-6,6, nylon-6,9, nylon-6,10, nylon-6,12, nylon-6,36, nylon-11, nylon-12, a semicrystalline semiaromatic polyamide, a copolyamide, or a polyphthalamides.

15. The article as claimed in claim 1, wherein the matrix yarns and/or fibers further comprise additives, which are flame retardants, plasticizers, heat and light stabilizers, waxes, pigments, nucleating agents, antioxidants, or impact strength modifiers.

16. The article as claimed in claim 1, wherein the reinforcing yarns and/or fibers are carbon, glass, aramid, polyimide yarns or fibers.

17. The article as claimed in claim 1, wherein the reinforcing yarns and/or fibers are natural yarns, fibers, sisal, hemp or flax yarns.

18. The article as claimed in claim 1, further comprising a matrix precursor powder material.

19. The article as claimed in claim 18, wherein said matrix precursor powder material is a polyamide.

20. A composite, made by at least partial melting of the matrix yarns and/or fibers of an article as defined in claim 1.

21. The composite as claimed in claim 20, having a reinforcement content of between 25 and 80% by weight.

22. A process for the fabrication of a semifinished product, comprising the step of thermoforming or calendering the article as defined in claim 1, in order to at least partially melt the matrix yarns and/or fibers so as to impregnate the reinforcing yarns and/or fibers.

23. A process for the fabrication of a finished product, comprising the step of thermoforming the article as defined in claim 1, to a final shape, in order to at least partially melt the matrix yarns and/or fibers so as to impregnate the reinforcing yarns and/or fibers.

24. The article as claimed in claim 1, wherein said reinforcing yarn and/or fibers further comprise a part made of thermoplastic polymer.

25. The article as claimed in claim 24, wherein said thermoplastic polymer of said reinforcing yarn and/or fiber comprises said at least one polycondensate.

26. The article as claimed in claim 5, wherein the polyamide A1 or the polyester A2 comprises at least 60 mol % of macromolecular chains satisfying formula (I).

27. The article as claimed in claim 1, wherein R$_1$ is a linear or cyclic, aromatic or aliphatic, hydrocarbon radical containing at least 2 carbon atoms.

28. The article as claimed in claim 5, wherein R$_1$ is a linear or cyclic, aromatic or aliphatic, hydrocarbon radical containing at least 2 carbon atoms.

* * * * *